Patented Mar. 15, 1938

2,111,379

UNITED STATES PATENT OFFICE 2,111,379

METHOD OF MAKING A PIGMENT

Edward M. Allen, Barberton, Ohio, assignor to Pittsburgh Plate Glass Company, Allegheny County, Pa., a corporation of Pennsylvania No Drawing. Application November 9, 1935, Serial No. 49,076

8 Claims. (Cl. 134—58)

This invention relates to a method for improving the color and hiding power of pigments during the grinding operation.

As a common practice in the art, ball mills and the like have been used extensively for disintegrating and reducing the particle size of pigments, thus making them more valuable because of their smaller particle size alone, when used as fillers and reinforcing agents, particularly in the paint and rubber industries.

Heretofore the usual procedure has been to put iron or flint balls in a tube mill, or a mill equipped with an agitator for stirring the balls, and grinding the pigment until the desired particle size has been attained. The use of iron balls presents the difficulty of the iron wearing off in very fine particles and adhering to the surface of the pigment, thus giving it a brownish yellow color, as the iron readily oxidizes upon contact with oxygen from the air. On the other hand, flint balls do not produce any appreciable effect so far as color contamination is concerned, but the density of flint is considerably less than that of iron, in fact, in some cases even less than the pigment being ground, making it less effective as a grinding medium.

This invention, in brief, comprises a method for grinding the pigment using as a grinding medium a metal so chosen that when the pigment is reacted with a gas or other treating agent, the very fine metal adhering to the surface of the pigment will combine with it to form a compound with high refractive index, thereby improving the color and hiding power of the pigment.

By the method of the invention, I have been able to reduce the particle size and at the same time improve the color and hiding power of such materials as silica, gypsum, talc, clay, whiting and the like, by grinding them in an attrition mill using as a grinding medium the appropriate metal shot, made of such materials as lead, aluminum, zinc, titanium, etc. After the grinding operation the pigment is subjected to treatment with a gas or other compound such as carbon dioxide, oxygen, hydrogen sulphide, a metallic sulphide, etc., to form the appropriate compound of the metal adhering to the surface of the pigment.

Basic lead carbonate, zinc sulphide, titanium dioxide and the like, because of their higher refractive indices, have better hiding powers than some of the cheaper and more common minerals and, therefore, are more valuable for use in the paint and paper industries. By the method of this invention, it is possible to make pigment, having as a base material one of the cheaper and more common minerals, by covering this mineral with a very fine coating of one of the more expensive products, thereby producing pigment having the qualities of the more expensive products at only a fraction of their cost.

In order to describe the invention more clearly, the following specific examples are given. It is not intended, however, to restrict the invention to the particular conditions and proportions recited, since it will be well understood by those skilled in the art that these examples are only illustrative and many modifications may be made without departing from the spirit and scope of the invention:

Example 1

A slurry of water and whiting containing about 20 per cent of solids is charged into a ball mill, containing zinc balls, and ground until the desired particle size has been obtained. After grinding in the ball mill, the whiting is a dark gray color due to extremely small particles of zinc which have rubbed off the balls. These metal particles are adsorbed or embedded in the surface of the whiting particles. The whiting slurry is then separated from the balls and treated with hydrogen sulphide, heat being applied to the slurry at the same time to hasten the reaction. The acid sulphide reacts with the zinc according to the following equation:

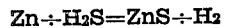

$$Zn + H_2S = ZnS + H_2$$

thus producing a white pigment with very good covering properties.

Example 2

A slurry of whiting and water containing 20 per cent of solids is charged into the ball mill, together with zinc balls which serve as the grinding medium. The mill is evacuated and refilled with an atmosphere of hydrogen sulfide, this gas being present during the milling process. The charge is ground until the desired particle size has been obtained. If the milling is continued for any length of time, it is necessary to repeat the process of evacuating and filling the mill with hydrogen sulfide in order to maintain a high concentration of that gas. During the operation, the hydrogen sulfide combines with the zinc and hydrogen is liberated.

The sulfide may be introduced as elemental sulfur and by maintaining a high hydrogen ion concentration, part of the sulfur will hydrolize to form both the sulfide and sulfite. These compounds will in turn react with the metallic zinc to form the respective metal salts. This method, however, suffers from the necessity of removing the excess sulfur from the finished product either by extraction or ignition.

After the milling is completed, the charge is removed from the mill, filtered and dried. In the event sulfur has been used, the product is ignited to remove any excess sulfur contained in the pigment material.

*Example 3*

A slurry of whiting and water containing 20 per cent of solids is charged into the mill together with sulfur in ionic form, either as the normal sulfide or hydrosulfide of the alkaline earth metals or the alkali metals. The term "alkali metals" is meant to include the ammonium compounds as well as the ordinary potassium and sodium compounds. The use of the ammonia compounds is preferable inasmuch as it can be removed from the mixture by heat during the drying operation. The other treating compounds are removed only by a difficult washing operation or by precipitating them by the addition of the appropriate cation. The grinding is continued until the desired particle size is reached, during which period the finely divided zinc particles are transformed into zinc sulfide. The mixture is removed from the mill and dried.

*Example 4*

Gypsum is precipitated by mixing clear filtered solutions of sodium sulfate and calcium chloride, both of which have been made alkaline before filtering to remove any iron present as an impurity. The gypsum is then charged into the mill with distilled sulfur as a 20 per cent slurry and ground through the medium of pure zinc balls which range in size from 1 to 3 mm. in diameter. After milling for a sufficient length of time to obtain the desired particle size, the slurry is removed from the mill, separated from the zinc balls, heated and aerated to oxidize all of the metallic zinc adhering to the gypsum particles. It is then dried by filtering and heating. The finished product contained 5.19 per cent of zinc and 0.21 per cent of sulfide sulfur. The hiding power was 11 square centimeters per gram as measured with the Pfund cryptometer. This is about twice the hiding power obtained from straight gypsum. When this product was mixed with 10 per cent of titanium dioxide the hiding power was 44 square centimeters per gram which corresponds to high strength lithopone. That is regular 30–70 per cent lithopone which has been mixed with 15 per cent titanium dioxide.

*Example 5*

Gypsum as prepared in the preceding example, sulfur and 10 per cent by weight of titanium dioxide are charged in the mill and treated as in the preceding example. This product when incorporated in a linseed oil vehicle showed a hiding power of 64 square centimeters per gram, which corresponds to pure titanium dioxide.

In all of the examples given, the pigment was slightly yellow after milling, which was probably due to traces of calcium sulfide or polysulfide being present. By treating the resultant slurry with carbon dioxide, the yellow color is eliminated and the product is white. This step is essential only when it is desired to obtain a pure white pigment.

It is apparent that various modifications and combinations of the above illustrations may be used and that the quantities may be varied and it is not intended to restrict the invention to the particular embodiments described.

What I claim is:

1. A process of manufacturing pigment which consists in grinding a purified slurry of gypsum with zinc balls in the presence of hydrogen sulfide, and drying the final product.

2. A process of manufacturing pigment which consists in grinding a mixture of a purified slurry of gypsum and titanium dioxide with zinc balls in the presence of hydrogen sulfide, and drying the resultant mixture.

3. A process of manufacturing while pigment which consists in grinding a slurry of whiting with zinc balls, treating the mixture with hydrogen sulfide and subsequently treating the mixture with carbon dioxide gas.

4. A process of manufacturing pigment having a high refractive index and good covering power, which comprises grinding a material of low refractive index and poor hiding power selected from the group of compounds used as fillers and extenders for coating compositions in an attrition mill charged with balls of a soft metal which is the base of a pigment having a high refractive index and good covering power to decrease the particle size of the material being ground and simultaneously to reduce the metallic balls to minute fragments which adhere to the surface of the particles of the ground material, and treating the ground material chemically to convert the adherent metallic fragments into a compound having a high refractive index and good covering power.

5. A process of manufacturing pigment having a high refractive index and good covering power, which comprises grinding a material of low refractive index and poor hiding power selected from the group of compounds used as fillers and extenders for coating compositions in an attrition mill charged with balls of a soft metal which is the base of a pigment having a high refractive index and good covering power to decrease the particle size of the material being ground and simultaneously to reduce the metallic balls to minute fragments which adhere to the surface of the particles of ground material, and treating the ground material with a gas to convert the adherent metallic fragments into a compound having a high refractive index and good covering power.

6. A process of manufacturing pigment having a high refractive index and good covering power, which comprises forming a slurry of a material of low refractive index and poor hiding power selected from the group of compounds used as fillers and extenders for coating compositions, grinding the slurry in an attrition mill with balls formed of a soft metal which is the base of a pigment having a high refractive index and good covering power to decrease the particle size of the solid content of the slurry and simultaneously to embed minute fragments of adherent metal from the balls in the surface of the particles of the solid material dispersed in the slurry, treating the ground slurry with a gas to change the finely divided metallic fragments into a compound having a high refractive index and good covering power, filtering the treated slurry and drying the resultant product.

7. A process of manufacturing pigment having a high refractive index and good covering power which comprises forming a slurry containing approximately 20% of a finely divided material of low refractive index and poor hiding power selected from the group of compounds used as fillers and extenders for coating compositions, adding a relatively large quantity of balls formed of a soft metal which is the base of a pigment having a high refractive index and good covering power to the slurry, charging the mixture into an attrition mill, milling the mixture to decrease the particle size of the solid content of the slurry and simultaneously to deposit an adherent coating of metal obtained from the balls upon the surface of the particles of the solid material dispersed in the slurry, removing the ground slurry from the mill, treating the slurry with a gas to convert the finely divided metallic particles into a compound having a high refractive index and good covering power, filtering the treated slurry and drying the resultant product.

8. A process of improving the color and hiding power of finely divided materials having low refractive indices and poor hiding power, used as fillers and extenders for coating compositions, which comprises forming a slurry of the material, adding a relatively large quantity of balls formed of a metal selected from a group consisting of lead, zinc, titanium, and aluminum, grinding the mixture to cause fine particles of the metal to adhere to the surface of the solid material dispersed in the slurry, treating the slurry with a gas to convert the adherent metallic particles into a coating of a compound having a high refractive index and good covering power.

EDWARD M. ALLEN.